(12) United States Patent
DeBusk et al.

(10) Patent No.: US 9,092,518 B2
(45) Date of Patent: *Jul. 28, 2015

(54) AUTOMATIC IDENTIFICATION OF REPEATED MATERIAL IN AUDIO SIGNALS

(71) Applicant: Shazam Investments Limited, London (GB)

(72) Inventors: David L. DeBusk, Nashville, TN (US); Darren P. Briggs, Nashville, TN (US); Michael Karliner, London (GB); Richard W. Cheong Tang, Middlesex (GB); Avery Li-Chun Wang, Palo Alto, CA (US)

(73) Assignee: Shazam Investments Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,552

(22) Filed: Oct. 28, 2013

(65) Prior Publication Data

US 2014/0052284 A1 Feb. 20, 2014

Related U.S. Application Data

(63) Continuation of application No. 13/309,985, filed on Dec. 2, 2011, now Pat. No. 8,571,864, which is a continuation of application No. 11/350,254, filed on Feb. 8, 2006, now Pat. No. 8,090,579.

(60) Provisional application No. 60/651,010, filed on Feb. 8, 2005.

(51) Int. Cl.
*G10L 15/00* (2013.01)
*G06F 17/30* (2006.01)
(Continued)

(52) U.S. Cl.
CPC ...... *G06F 17/30746* (2013.01); *G06K 9/00523* (2013.01); *G10L 19/018* (2013.01); *G10L 25/48* (2013.01); *H04H 60/37* (2013.01); *H04H 60/58* (2013.01)

(58) Field of Classification Search
USPC .................. 704/233, 235, 239, 243, 251
See application file for complete search history.

(56) References Cited

U.S. PATENT DOCUMENTS

| 4,415,767 A | 11/1983 | Gill et al. |
| 4,450,531 A | 5/1984 | Kenyon et al. |

(Continued)

FOREIGN PATENT DOCUMENTS

| WO | WO 01/04870 | 1/2001 |
| WO | WO 01/88900 | 11/2001 |

(Continued)

OTHER PUBLICATIONS

Extended EPO Search Report Dated Jul. 7, 2008, for EP 06 72 0563.
(Continued)

*Primary Examiner* — Leonard Saint Cyr
(74) *Attorney, Agent, or Firm* — McDonnell Boehnen Hulbert & Berghoff LLP

(57) ABSTRACT

A system and method are described for recognizing repeated audio material within at least one media stream without prior knowledge of the nature of the repeated material. The system and method are able to create a screening database from the media stream or streams. An unknown sample audio fragment is taken from the media stream and compared against the screening database to find if there are matching fragments within the media streams by determining if the unknown sample matches any samples in the screening database.

20 Claims, 6 Drawing Sheets

(51) Int. Cl.
*G06K 9/00* (2006.01)
*G10L 25/48* (2013.01)
*H04H 60/37* (2008.01)
*H04H 60/58* (2008.01)
*G10L 19/018* (2013.01)

(56) References Cited

U.S. PATENT DOCUMENTS

| | | | |
|---|---|---|---|
| 4,843,562 | A | 6/1989 | Kenyon et al. |
| 4,852,181 | A | 7/1989 | Morito et al. |
| 5,210,820 | A | 5/1993 | Kenyon |
| 5,276,629 | A | 1/1994 | Reynolds |
| 5,400,261 | A | 3/1995 | Reynolds |
| 5,437,050 | A | 7/1995 | Lamb |
| 5,918,223 | A | 6/1999 | Blum et al. |
| 6,434,520 | B1 | 8/2002 | Kanevsky et al. |
| 6,453,252 | B1 | 9/2002 | Laroche |
| 6,480,825 | B1 | 11/2002 | Sharma et al. |
| 6,483,927 | B2 | 11/2002 | Brunk et al. |
| 6,570,080 | B1 | 5/2003 | Hasegawa et al. |
| 6,748,360 | B2 | 6/2004 | Pitman et al. |
| 6,766,523 | B2 | 7/2004 | Herley |
| 6,834,308 | B1 | 12/2004 | Ikezoye et al. |
| 6,990,453 | B2 | 1/2006 | Wang et al. |
| 7,174,293 | B2 | 2/2007 | Kenyon et al. |
| 7,194,752 | B1 | 3/2007 | Kenyon et al. |
| 8,090,579 | B2 | 1/2012 | DeBusk et al. |
| 2002/0023020 | A1 | 2/2002 | Kenyon et al. |
| 2002/0083060 | A1 | 6/2002 | Wang et al. |
| 2003/0231868 | A1 | 12/2003 | Herley |
| 2004/0199387 | A1 | 10/2004 | Wang et al. |
| 2004/0260682 | A1 | 12/2004 | Herley et al. |
| 2006/0122839 | A1 | 6/2006 | Wang et al. |
| 2006/0149533 | A1 | 7/2006 | Bogdanov |
| 2006/0149552 | A1 | 7/2006 | Bogdanov |
| 2012/0076310 | A1 | 3/2012 | DeBusk et al. |

FOREIGN PATENT DOCUMENTS

| | | |
|---|---|---|
| WO | WO 02/11123 | 2/2002 |
| WO | WO 03/091990 | 11/2003 |
| WO | WO 2004/004345 | 1/2004 |
| WO | WO 2004/004351 | 1/2004 |

OTHER PUBLICATIONS

International Search Report and Written Opinion issued for PCT/US06/04593 dated Sep. 19, 2007.

J.T. Foote, "An Overview of Audio Information Retrieval." In ACM-Springer Multimedia Systems, vol. 7 No. 1,pp. 2-11, ACM Press/SprinQer-VerlaQ, Jan. 1999.

J.T. Foote, "Content-Based Retrieval of Music and Audio." in C.-C.J. Kuo et al., editor, Multimedia Storage and ArchivinQ Systems II, Proc. of SPIE, vol. 3229, pp. 138-147, 1997.

M.G. Brown, J. T. Foote, G.J.F. Jones, K. Sparck Jones, and S.J. Young, "Automatic Content-Based Retrieval of Broadcast News." In Proc. ACM Multimedia 95, San Francisco, Nov. 1995.

Udi Manber, "Finding Similar Files in a Large File System." Oct. 1993, Department of Computer Science, The University of Arizona, Tucson Arizona 85721.

Sharlene A. Uu, "Landmark Dectection for Distinctive Feature-Based Speech Recognition," J. Acoiust. Soc. Am. 100 (5), Nov. 1996, pp. 3417-3430.

Matthew L. Miller et al., "Audio Fingerprinting: Nearest Neighbor Search in High Dimensioinal Binary Spaces," IEEE Multimedia Signal Processing Workshop 2002, St. Thomas, US Virgin Islands.

Erling Wold et al.., "Content-Based Classification, Search, and Retrieval of Audio," in IEEE Multimedia, col. 3, No. 3: Fall1996, pp. 27-36.

C. Yang, "Music Database Retrieval Based on Spectral Similarity," Stanford University Database Group Technical Report 2001-14, http://citeseer.ist.psu.edu/yanq01 music.html., submitted Mar. 28, 2001 9 pages, [Retrieved from the Internet on Jun. 6, 2005] [Retrieved from URL://http://citseer.ist.psu.edu/yang01music.html].

Kashino et al. "A Quick Search Method for Audio and Video Signals Based on Histogram Pruning", Sep. 2003, Published in IEEE vol. 5, No. 3 pp. 348-357.

AUTOMATIC IDENTIFICATION OF REPEATED MATERIAL IN AUDIO SIGNALS

CROSS-REFERENCE TO RELATED APPLICATIONS

This application claims priority to U.S. Provisional Patent Application No. 60/651,010 filed Feb. 8, 2005, entitled AUTOMATIC IDENTIFICATION OF REPEATED MATERIAL IN AUDIO SIGNALS, the disclosure of which is hereby incorporated by reference in its entirety. This application also claims priority to U.S. patent application Ser. No. 11/350,254, filed on Feb. 8, 2006, the disclosure of which is hereby incorporated by reference in its entirety. This application also claims priority to U.S. patent application Ser. No. 13/309,985, filed on Dec. 2, 2011, the disclosure of which is hereby incorporated by reference in its entirety.

TECHNICAL FIELD

This invention relates to pattern recognition and identification in media files, and more particularly to identifying repeated material in media signals, particularly audio signals, across one or more media streams.

BACKGROUND OF THE INVENTION

Copyright holders, such as for music or video content, are generally entitled to compensation for each instance that their song or video is played. For music copyright holders in particular, determining when their songs are played on any of thousands of radio stations, both over the air, and now on the internet, is a daunting task. Traditionally, copyright holders have turned over collection of royalties in these circumstances to third party companies who charge entities who play music for commercial purposes a subscription fee to compensate their catalogue of copyright holders. These fees are then distributed to the copyright holders based on statistical models designed to compensate those copyright holders according which songs are receiving the most play. These statistical methods have only been very rough estimates of actual playing instances based on small sample sizes.

U.S. Pat. No. 6,990,453 issued Jan. 4, 2006 describes a system and method for comparing unknown media samples from a media stream such as a radio stations signal against a database of known media files such as songs, in order to track the instances of play for known songs. Unfortunately, much of the content of a media stream is not previously known for a variety of reasons. For example unique audio such as talk shows, the conversations or introductions of disk jockeys, or DJs, and other similar audio, represent unique audio that will not be recognizable.

There may be other unrecognized audio however, that may be of interest to a system for monitoring audio streams, and may in fact be associated with a copyright holder who should be compensated. Such non-recognized audio of interest could be a previously unindexed song, or a commercial which may use copyrighted music, or other recognized and repeated audio segments. These non-recognized audio segments may be repeated inside a single media stream or may be repeated across multiple media streams, such as a regional commercial playing on multiple radio stations.

What is needed is a system and method for recognizing repeated segments or samples in one or more otherwise non-recognized media streams, where the system and method are capable of matching samples against previously fingerprinted or index samples to find occurrences of repeated unrecognized media.

BRIEF SUMMARY OF THE INVENTION

Accordingly, the present application describes a method of recognizing repeated audio material within at least one media stream without prior knowledge of the nature of the repeated material. The method including creating a screening database from the media stream or streams taking an unknown sample audio fragment from the media stream, finding matching fragments within the media stream and determining if the unknown sample matches any samples in the screening database.

In another embodiment, a system for recognizing repeated segments of non-recognized media content in at least one source of non-recognized media content, the system is described, the system including a candidate manager receiving the non-recognized media and associating an identifier with samples of the non-recognized media. The system further includes a fingerprint generator operable to create fingerprints for non-recognized media segments, and an media search engine connected to the candidate manager and the fingerprint generator, the media search engine able to compare fingerprints of non-recognized media against a database of previously stored non-recognized media fingerprints to find repeated segments within the non-recognized media content.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is made to the following descriptions taken in conjunction with the accompanying drawing, in which.

DETAILED DESCRIPTION OF THE INVENTION

It is now common practice to use automated methods to identify pre-recorded material contained in audio signals such as recordings of radio or TV broadcast, or recordings of performances of material in public places such as night clubs. Regardless of the techniques used, these methods require prior access to the material to be identified, so that the signal can be matched against known content in a reference database. For much material, this is not a problem, as it may have been commercially available for some time, as in the case of music CD's. However, a significant percentage of audio signals consist of material that may not be readily available, such as music before a commercial release date, advertising material, or music written for the purposes of radio station identification, for example.

This creates two problems for those involved in accurately quantifying the content of audio signals:

(1) that material that should be identified is not because it is not contained in the reference database, and (2) substantial parts of a signal, while not containing material of interest, cannot be eliminated from manual examination because the automatic method does not positively identify it as not interesting.

Audio may be identified and segmented directly, for example using the technique by Wang (U.S. Provisional Patent Application Ser. No. 60/563,372, which is hereby entirely incorporated by reference), in which audio that is identified out of a database is segmented into known regions, with the remaining regions being left as Non-Recognized Audio (NRA). Wang's method is limited to recognizing content that is already in a database, and cannot identify and segment material not contained in a database.

To overcome this limitation, a "sifting" method is used to examine non-recognized segments of audio (NRA) from monitored media streams and to check if they match other segments or portions of segments from the recent past. Once such matches have been found, they may be segmented and included into the reference database, thus allowing databases to be created without any prior access to the target material of interest.

Figure 1:
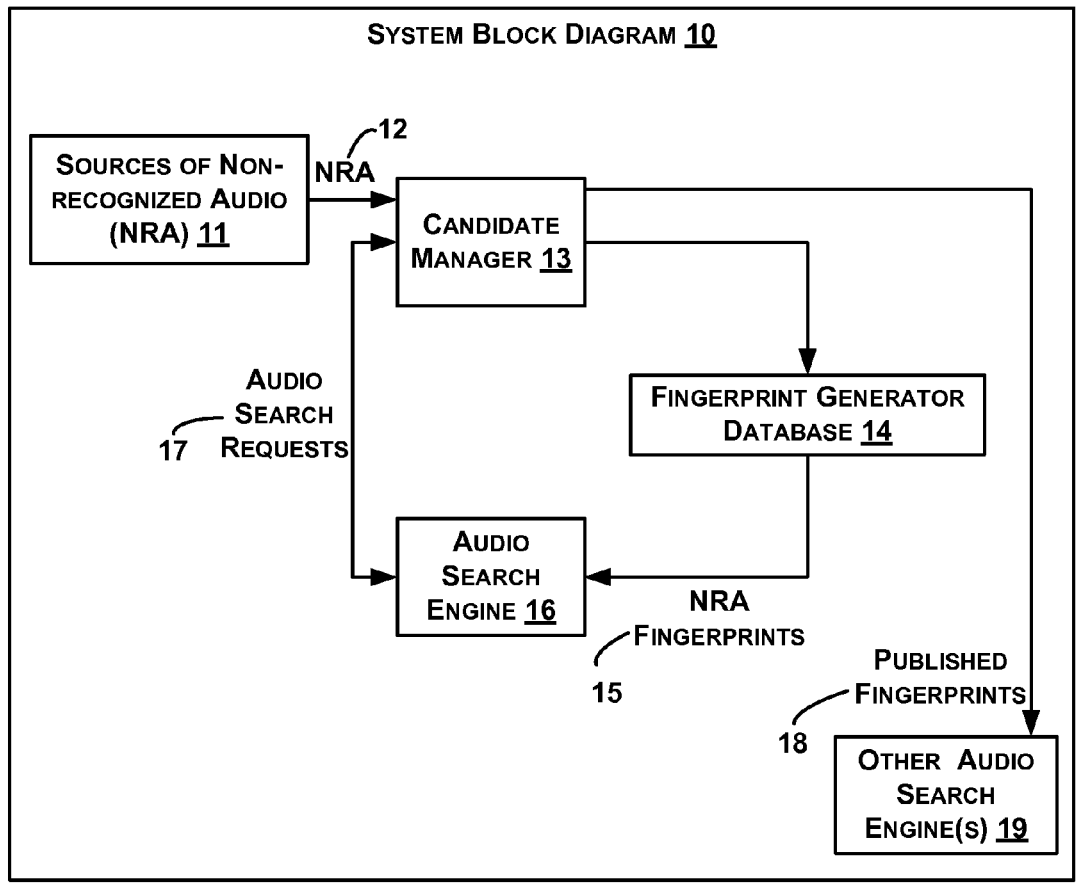
FIG. 1 is a block diagram of an embodiment of a system of creating a database of items of interest in Non-Recognized Audio streams.

A system of creating a database of items of interest in NRA streams is shown in FIG. 1. System 10 takes NRA streams 12 from sources of non-recognized audio 11 and identifies repeated segments within the NRA that may be of interest. NRA segments 12 are sent to candidate manager 13 which collects and marks each instant of data in the media stream with a unique identifier. Candidate manager 13 then sends the NRA to finger print generator 14 wherein the raw audio segments from the NRA are processed to extract fingerprint features and indexed into a searchable database. Audio Search Engine 16 responds to audio search requests from candidate manager 13 and uses NRA fingerprints 15 from fingerprint generator 14 to compare NRA segments against the database of previously indexed NRA segments. Audio Search Engine 16 records matches of NRA segments against indexed NRA segments. When a particular segment of NRA accumulates a certain threshold number of matches, meaning that system 10 has seen the same audio content multiple times across one or more audio streams, that audio segment is determined to be of significant enough interest to warrant positive identification. This is accomplished by publishing the significant content, published fingerprints 18, and adding it to other recognized search engines 19.

The significant NRA segments, those having multiple matches in the monitored audio streams, may need to be sent to be positively identified and catalogued. Identifying the significant NRA segment may require that it be sent to a human operator who will listen to the audio to make a positive identification. The human operator will identify the audio and enter the necessary information to allow the significant NRA segment to be added to the database of know audio content as is described in the other applications incorporated herein by reference.

Figure 2:
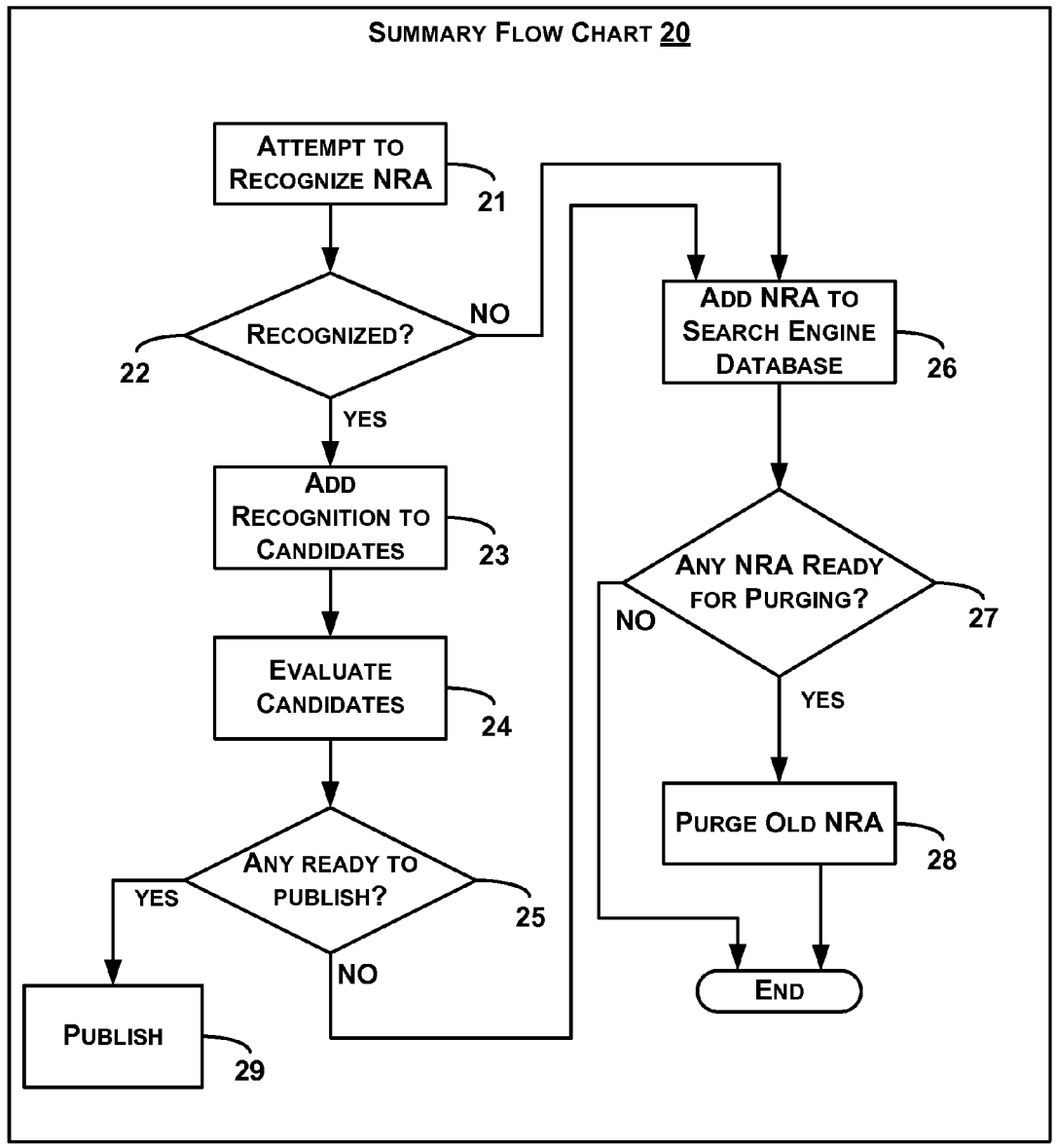
FIG. 2 is a flow chart of an embodiment of a method for creating matching repeated segments of NRA.

One method for recognizing repeated material is described with respect to FIG. 2. Method 20 collects unknown (NRA) audio from one or more media streams for sifting, wherein each instant of audio data has a unique timestamp reference (such timestamp reference increases with time and can be augmented with a stream identifier).

A screening database containing unknown (NRA) audio program material from monitored media streams in the recent past is created for screening, wherein the raw audio recordings are processed to extract fingerprint features and indexed into a searchable database. Methods for preparing such a database are disclosed in Wang and Smith (described in International Publication Number WO 02/11123 A2, entitled System and Methods for Recognizing Sound and Music Signals in High Noise and Distortion and claiming priority to U.S. Provisional Application No. 60/222,023 filed Jul. 31, 2000 and U.S. application Ser. No. 09/839,476 filed Apr. 20, 2001, (hereinafter "Wang and Smith"), the contents of which are herein incorporated by reference); or Wang and Culbert (described in International Publication No. WO 03/091990 A1, entitled "Robust and Invariant Audio Pattern Matching" and claiming priority to U.S. Provisional Application 60/376,055 filed Apr. 25, 2002, the contents of which are incorporated herein by reference (hereinafter "Wang and Culbert")). The use of these particular methods from "Wang and Smith" or "Wang and Culbert" are illustrative and not to be construed as limiting.

To process the automatic segmentation, short probe fragments from the unknown media stream material are submitted for recognition to audio search engine 16 from FIG. 1 embodying an identification technique such as that of "Wang and Smith" or "Wang and Culbert", incorporating the screening database, and as shown by process 21. A determination is made in process 22 as to whether the NRA matches any previously fingerprinted candidates. Matching segments are then identified out of the unknown media streams and the recognition is added to existing candidates in process 23.

If a probe fragment $F_0(0)$ is recognized, the matching results $F_{0,k}(0)$ (where k is a match index) from the screening database are grouped in a matching fragment list. The task is to discover the boundaries and quality of matches of matching segments. To this end, adjacent probe fragments $F_0(t)$, where t is a time offset from $F_0(0)$, are submitted for recognition and their corresponding matching fragment lists are retrieved. The corresponding matching fragment lists are scanned for continuity, i.e., where adjacent probe fragments map onto substantially adjacent matching fragments. A chain of adjacent probe fragments may map onto one or more matching parallel chains of fragments. Such a bundle of parallel chains forms a candidate group. Each matching parallel chain is extended as far as possible in both directions in time to form a maximal matching parallel chain. A candidate segmentation point is where a plurality of matching parallel chains substantially simultaneously end or begin.

The set of maximal matching parallel chains could have different lengths and also different endpoints. This may be due to hierarchical nesting of repeated program segments. Differential segmentation could be due to different versions of a song or commercial. Alternatively, some repeated material could be embedded into repeated programs: often radio programs are aired multiple times throughout the day.

One way to determine a hierarchy of segmentation is to weight parallel chains at each fragment according to the number of matching elements in its matching fragment list. The set of parallel chains with the highest weighting is most likely to be an atomic program segment, such as a song or advertisement. Parallel chains with the next highest weightings could be due to repeated radio programs containing the atomic program segments, such as for hourly newscasts or cyclic airing of top-40 hit songs, for example. Highly-weighted parallel chains are good candidates to be atomic program segments and may be promoted to be published in a reference database for recognition of ads or songs. The criteria for publication may include such parameters as the number of candidates in the group (how many times the material has been repeated), and the exactness of the correlation between the candidates, e.g., choosing the segment with the best overall pair-wise mutual scores against other elements of its matching fragment lists. Once published, the source media stream that provided the original audio samples corresponding to the best matching exemplar of repeated material may be copied to provide a contiguous audio sample. The reason that a "best" example may need to be identified is typically because some repeated material, such as a musical track, may be overlaid with non-repeated material, such as a program presenter talking over the music. The "best" candidate will be the one with the least amount of such spurious content.

Returning to FIG. 2, process 24 evaluates candidates that have been recognized to determine if they meet the threshold for publication, as shown be process 25. If the candidate is ready, it is published as shown by process 29. If the candidate is not ready for publication in process 25, any additional information is added to the search engine database in process 26. Returning to process 22, if the NRA segment is not recognized the method jumps to process 26 where the segment is added to the search engine database.

Method 20, in process 27, then determines whether there is any old NRA that has not been matched that is ready for purging. As much of the audio stream will be unique audio that will never be matched, such as live talk shows, radio promotions, or simply the talking of radio personalities or DJs, this information needs to be purged from the system to make room for new NRA being processed. If there is NRA ready for purging, as determined from the timestamp, the availability of memory for new NRA content, or a combination of these or other factors, the method passes to process 28 which purges the old NRA. If there is no NRA for purging in process 28 or if the old NRA has been purged the process ends. It will be recognized by those skilled in the art that method 20 is a continual process that constantly attempts to recognize new NRA as the processed NRA is passed through the other processed in the method.

The above process may be interpreted as working on a fixed batch of unknown audio stream material. However, it may be enhanced to process data on an incremental basis. As new media stream content is captured, it is added to the screening database. The new material is also used to form probe fragments and scanned for repeated material as described above. Furthermore, old material may be removed from the screening database, thus preventing its unconstrained growth. One way to do this, according to "Wang and Smith", is to continually regenerate the screening database using a moving window of unknown media stream material as new data arrives and old data is retired.

Referring to FIGS. 3-6, an embodiment of fingerprinting and indexing NRA segments is described.

Figure 3:
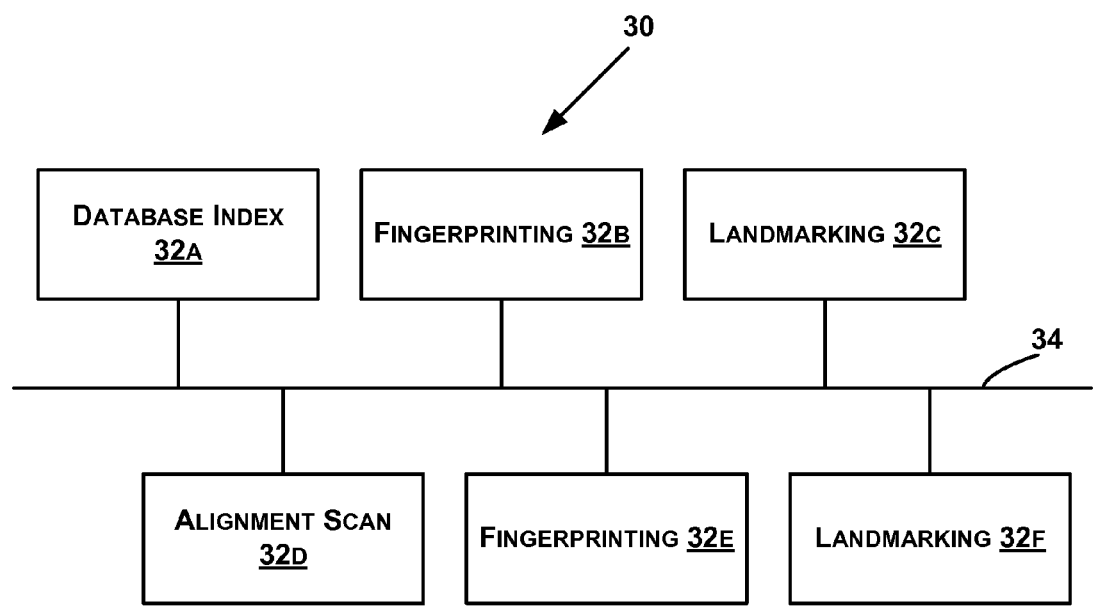
FIG. 3 is a block diagram of an embodiment of a computer system for implementing a fingerprinting and landmarking system as described herein.

Although the invention is not limited to any particular hardware system, an example of an embodiment of a computer system 30, which may or may not be distributed, for use in fingerprinting and landmarking media segments, such as a NRA segment is illustrated schematically in FIG. 3. System 30 processors 32$a$-32$f$ connected by multiprocessing bus architecture 34 or a networking protocol such as the Beowulf cluster computing protocol, or a mixture of the two. In such an arrangement, the database index is preferably stored in random access memory (RAM) on at least one node 32$a$ in the cluster, ensuring that fingerprint searching occurs very rapidly. The computational nodes corresponding to the other objects, such as landmarking nodes 32$c$ and 32$f$, fingerprinting nodes 32$b$ and 32$e$, and alignment scanning node 32$d$, do not require as much bulk RAM as does node or nodes 32$a$ supporting the database index. The number of computational nodes assigned to each object may thus be scaled according to need so that no single object becomes a bottleneck. The computational network is therefore highly parallelizable and can additionally process multiple simultaneous signal recognition queries that are distributed among available computational resources.

In an alternative embodiment, certain of the functional objects are more tightly coupled together, while remaining less tightly coupled to other objects. For example, the landmarking and fingerprinting object can reside in a physically separate location from the rest of the computational objects. One example of this is a tight association of the landmarking and fingerprinting objects with the signal capturing process. In this arrangement, the landmarking and fingerprinting object can be incorporated as additional hardware or software embedded in, for example, a mobile phone, Wireless Application Protocol (WAP) browser, personal digital assistant (PDA), or other remote terminal, such as the client end of an audio search engine. In an Internet-based audio search service, such as a content identification service, the landmarking and fingerprinting object can be incorporated into the client browser application as a linked set of software instructions or a software plug-in module such as a Microsoft dynamic link library (DLL). In these embodiments, the combined signal capture, landmarking, and fingerprinting object constitutes the client end of the service. The client end sends a feature-extracted summary of the captured signal sample containing landmark and fingerprint pairs to the server end, which performs the recognition. Sending this feature-extracted summary to the server, instead of the raw captured signal, is advantageous because the amount of data is greatly reduced, often by a factor of 500 or more. Such information can be sent in real time over a low-bandwidth side channel along with or instead of, e.g., an audio stream transmitted to the server. This enables performing the invention over public communications networks, which offer relatively small-sized bandwidths to each user.

An embodiment of a method for finger printing and landmarking will now be described in detail with reference to audio samples, which can be NRA samples or segments, and NRA segments already indexed in a database such as database 14 from FIG. 1.

Before recognition can be performed, a searchable sound database index must be constructed. As used herein, a database is any indexed collection of data, and is not limited to commercially available databases. In the database index, related elements of data are associated with one another, and individual elements can be used to retrieve associated data. The sound database index contains an index set for each file or recording in the selected collection or library of recordings, which may include speech, music, advertisements, sonar signatures, or other sounds. Each recording also has a unique identifier, sound_ID. The sound database itself does not necessarily store the audio files for each recording, but the sound_IDs can be used to retrieve the audio files from elsewhere. The sound database index is expected to be very large, containing indices for millions or even billions of files. New recordings are preferably added incrementally to the database index.

Figure 4:
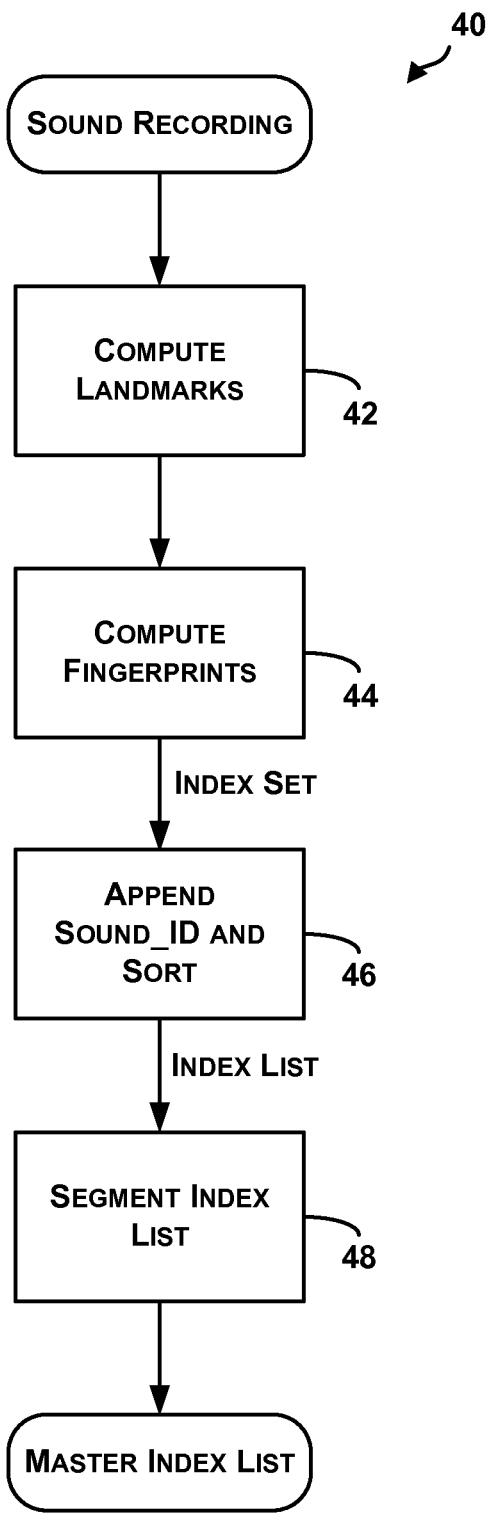
FIG. 4 is a flow chart of an embodiment of a method for constructing a database index of sound files.

A block diagram of a preferred method 40 for constructing the searchable sound database index according to a first embodiment is shown in FIG. 4. In this embodiment, landmarks are first computed, and then fingerprints are computed at or near the landmarks. As will be apparent to one of average skill in the art, alternative methods may be devised for constructing the database index. In particular, many of the steps listed below are optional, but serve to generate a database index that is more efficiently searched. While searching efficiency is important for real-time sound recognition from large databases, small databases can be searched relatively quickly even if they have not been sorted optimally.

Figure 5:
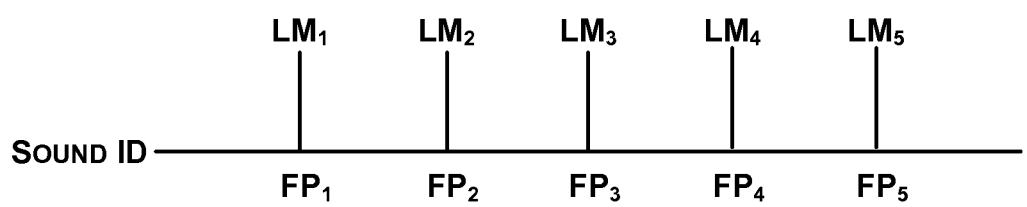
FIG. 5 schematically illustrates landmarks and fingerprints computed for a sound sample such as an NRA segment.

To index the database, each recording in the collection is subjected to a landmarking and fingerprinting analysis that generates an index set for each audio file. FIG. 5 schematically illustrates a segment of a sound recording for which landmarks (LM) and fingerprints (FP) have been computed. Landmarks occur at specific timepoints of the sound and have values in time units offset from the beginning of the file, while fingerprints characterize the sound at or near a particular landmark. Thus, in this embodiment, each landmark for a particular file is unique, while the same fingerprint can occur numerous times within a single file or multiple files.

In step 42, each sound recording is landmarked using methods to find distinctive and reproducible locations within the sound recording. A preferred landmarking algorithm is able to mark the same timepoints within a sound recording despite the presence of noise and other linear and nonlinear distortion. Some landmarking methods are conceptually independent of the fingerprinting process described below, but can be chosen to optimize performance of the latter. Landmarking results in a list of timepoints {landmark$_k$} within the sound recording at which fingerprints are subsequently calculated. A good landmarking scheme marks about 5-10 landmarks per second of sound recording; of course, landmarking density depends on the amount of activity within the sound recording.

A variety of techniques are possible for computing landmarks, all of which are within the scope of the present invention. The specific technical processes used to implement the landmarking schemes of the invention are known in the art and will not be discussed in detail. A simple landmarking technique, known as Power Norm, is to calculate the instantaneous power at every possible timepoint in the recording and to select local maxima. One way of doing this is to calculate the envelope by rectifying and filtering the waveform directly.

Another way is to calculate the Hilbert transform (quadrature) of the signal and use the sum of the magnitudes squared of the Hilbert transform and the original signal.

The Power Norm method of landmarking is good at finding transients in the sound signal. The Power Norm is actually a special case of the more general Spectral Lp Norm in which $p=2$. The general Spectral Lp Norm is calculated at each time along the sound signal by calculating a short-time spectrum, for example via a Hanning-windowed Fast Fourier Transform (FFT). A preferred embodiment uses a sampling rate of 8000 Hz, an FFT frame size of 1024 samples, and a stride of 64 samples for each time slice. The Lp norm for each time slice is then calculated as the sum of the $p^\wedge$ power of the absolute values of the spectral components, optionally followed by taking the $-p^\wedge$ root. As before, the landmarks are chosen as the local maxima of the resulting values over time. An example of the Spectral Lp Norm method is shown in FIG. 5, a graph of the L4 norm, as a function of time for a particular sound signal. Dashed lines at local maxima indicate the location of the chosen landmarks.

When $p=\infty$, the L∞ norm is effectively the maximum norm. That is, the value of the norm is the absolute value of the largest spectral component in the spectral slice. This norm results in robust landmarks and good overall recognition performance, and is preferred for tonal music. Alternatively, "multi-slice" spectral landmarks can be calculated by taking the sum of p01 powers of absolute values of spectral components over multiple timeslices at fixed or variable offsets from each other, instead of a single slice. Finding the local maxima of this extended sum allows optimization of placement of the multi-slice fingerprints, described below.

Once the landmarks have been computed, a fingerprint is computed at each landmark timepoint in the recording in step 44 The fingerprint is generally a value or set of values that summarizes a set of features in the recording at or near the timepoint. In a currently preferred embodiment, each fingerprint is a single numerical value that is a hashed function of multiple features. Possible types of fingerprints include spectral slice fingerprints, multi-slice fingerprints, LPC coefficients, and cepstral coefficients. Of course, any type of fingerprint that characterizes the signal or features of the signal near a landmark is within the scope of the present invention. Fingerprints can be computed by any type of digital signal processing or frequency analysis of the signal.

To generate spectral slice fingerprints, a frequency analysis is performed in the neighborhood of each landmark timepoint to extract the top several spectral peaks. A simple fingerprint value is just the single frequency value of the strongest spectral peak. The use of such a simple peak results in surprisingly good recognition in the presence of noise; however, single-frequency spectral slice fingerprints tend to generate more false positives than other fingerprinting schemes because they are not unique. The number of false positives can be reduced by using fingerprints consisting of a function of the two or three strongest spectral peaks. However, there may be a higher susceptibility to noise if the second-strongest spectral peak is not sufficiently strong enough to distinguish it from its competitors in the presence of noise. That is, the calculated fingerprint value may not be sufficiently robust to be reliably reproducible. Despite this, the performance of this case is also good.

In order to take advantage of the time evolution of many sounds, a set of timeslices is determined by adding a set of time offsets to a landmark timepoint. At each resulting timeslice, a spectral slice fingerprint is calculated. The resulting set of fingerprint information is then combined to form one multitone or multi-slice fingerprint. Each multi-slice fingerprint is much more unique than the single spectral slice fingerprint, because it tracks temporal evolution, resulting in fewer false matches in the database index search described below. Experiments indicate that because of their increased uniqueness, multi-slice fingerprints computed from the single strongest spectral peak in each of two timeslices result in much faster computation (about 100 times faster) in the subsequent database index search, but with some degradation in recognition percentage in the presence of significant noise.

Alternatively, instead of using a fixed offset or offsets from a given timeslice to calculate a multi-slice fingerprint, variable offsets can be used. The variable offset to the chosen slice is the offset to the next landmark, or a landmark in a certain Offset range from the "anchor" landmark for the fingerprint. In this case, the time difference between the landmarks is also encoded into the fingerprint, along with multi-frequency information. By adding more dimensions to the fingerprints, they become more unique and have a lower chance of false match.

In addition to spectral components, other spectral features can be extracted and used as fingerprints. Linear predictive coding (LPG) analysis extracts the linearly predictable features of a signal, such as spectral peaks, as well as spectral shape. LPC is well known in the art of digital signal processing. For the present invention, LPC coefficients of waveform slices anchored at landmark positions can be used as fingerprints by hashing the quantized LPC coefficients into an index value, Cepstrai coefficients are useful as a measure of periodicity and can be used to characterize signals that are harmonic, such as voices or many musical instruments. Cepstrai analysis is well known in the art of digital signal processing. For the present invention, a number of cepstrai coefficients are hashed together into an index and used as a fingerprint.

Figure 6:
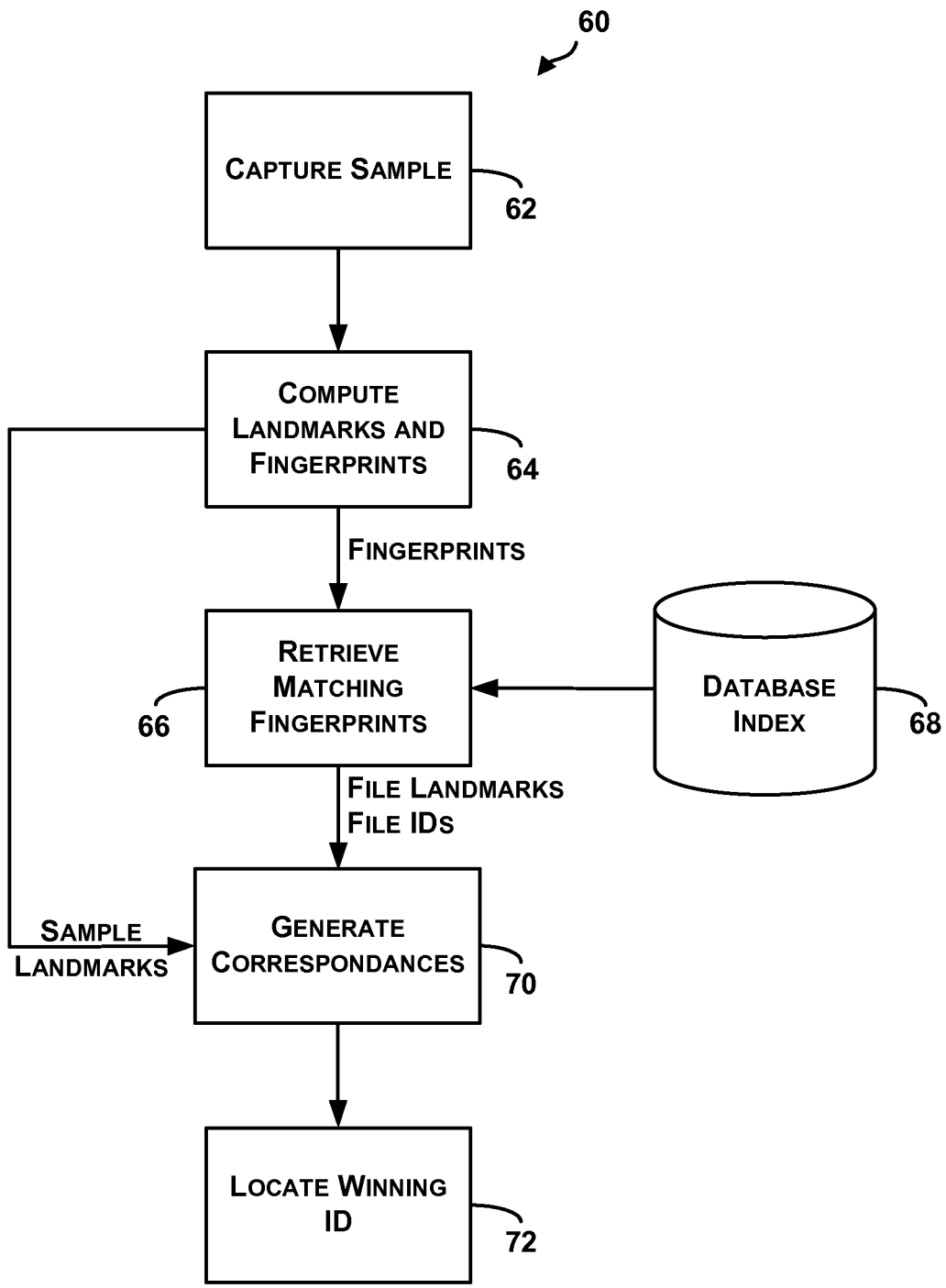
FIG. 6 is a flow chart of an embodiment of a method for matching NRA samples or segments to previously fingerprinted or indexed NRA samples or segments.

A block diagram conceptually illustrating the overall steps of an embodiment of a method 60 to compare NRA segments with NRA fingerprints, such as by audio search engine 16 in FIG. 1 is shown in FIG. 6. Individual steps are described in more detail below. The method identifies a matching NRA fingerprint whose relative locations of characteristic fingerprints most closely match the relative locations of the same fingerprints of the exogenous NRA sample. After an exogenous sample is captured in step 62, landmarks and fingerprints are computed in step 64. Landmarks occur at particular locations, e.g., timepoints, within the sample. The location within the sample of the landmarks is preferably determined by the sample itself, i.e., is dependent upon sample qualities, and is reproducible. That is, the same landmarks are computed for the same signal each time the process is repeated. For each landmark, a fingerprint characterizing one or more features of the sample at or near the landmark is obtained. The nearness of a feature to a landmark is defined by the fingerprinting method used. In some cases, a feature is considered near a landmark if it clearly corresponds to the landmark and not to a previous or subsequent landmark. In other cases, features correspond to multiple adjacent landmarks. For example, text fingerprints can be word strings, audio fingerprints can be spectral components, and image fingerprints can be pixel RGB values. Two general embodiments of step 64 are described below, one in which landmarks and fingerprints are computed sequentially, and one in which they are computed simultaneously.

In step 66, the sample fingerprints are used to retrieve sets of matching fingerprints stored in a database index 68, in which the matching fingerprints are associated with landmarks and identifiers of a set of NRA fingerprints. The set of retrieved file identifiers and landmark values are then used to generate correspondence pairs (step 70) containing sample landmarks (computed in step 64) and retrieved file landmarks at which the same fingerprints were computed. The resulting correspondence pairs are then sorted by an identifier, generating sets of correspondences between sample landmarks and file landmarks for each applicable file. Each set is scanned for alignment between the file landmarks and sample landmarks. That is, linear correspondences in the pairs of landmarks are identified, and the set is scored according to the number of pairs that are linearly related. A linear correspondence occurs when a large number of corresponding sample locations and file locations can be described with substantially the same linear equation, within an allowed tolerance. For example, if the slopes of a number of equations describing a set of correspondence pairs vary by ±5%, then the entire set of correspondences is considered to be linearly related. Of course, any suitable tolerance can be selected. The identifier of the set with the highest score, i.e., with the largest number of linearly related correspondences, is the winning NRA fingerprint identifier, which is located and returned in step 72.

As described further below, recognition can be performed with a time component proportional to the logarithm of the number of entries in the database. Recognition can be performed in essentially real time, even with a very large database. That is, a sample can be recognized as it is being obtained, with a small time lag. The method can identify a sound based on segments of 5-10 seconds and even as low 1-3 seconds. In a preferred embodiment, the landmarking and fingerprinting analysis, step 64, is carried out in real time as the samples being captured in step 62. Database queries (step 66) are carried out as sample fingerprints become available, and the correspondence results are accumulated and periodically scanned for linear correspondences. Thus all of the method steps occur simultaneously, and not in the sequential linear fashion suggested in FIG. 6. Note that the method is in part analogous to a text search engine: a user submits a query sample, and a matching file indexed in the sound database is returned.

As described above, this method automatically identifies repeated material, with a time granularity that is dependent on the length of the audio samples originally submitted. This is in itself useful, however, with the refinements to the Audio Recognition Engine listed above, the granularity may be substantially improved. The method for increased time resolution of candidate material is the same as the above, except that the Audio Recognition Engine returns the position and length of a match within an audio sample, thus allowing the system to be free of the audio sample granularity. The technique disclosed there looks at the support density of a number of matching overlapping time-aligned features extracted from the audio data. A region of "matching" overlap between two audio sample fragments has high density; conversely, non-matching regions have low density. A candidate segmentation point is chosen at a time offset within a matching media sample fragment demarcating a transition between high and low density overlap of features: This refinement yields segment endpoints within 100-200 milliseconds.

The system and method disclosed herein is typically implemented as software running on a computer system, with individual steps most efficiently implemented as independent software modules. Computer instruction code for the different objects is stored in a memory of one or more computers and executed by one or more computer processors. In one embodiment, the code objects are clustered together in a single computer system, such as an Intel-based personal computer or other workstation. In a preferred embodiment, the method is implemented by a networked cluster of central processing units (CPUs), in which different software objects are executed by different processors in order to distribute the computational load. Alternatively, each CPU can have a copy of all software objects, allowing for a homogeneous network of identically configured elements. In this latter configuration, each CPU has a subset of the database index and is responsible for searching its own subset of media files.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    receiving, at a computing device, a segment of non-recognized data from a media stream, wherein the non-recognized data comprises unknown content;
    determining whether the segment of non-recognized data matches previous non-recognized data from one or more media streams so as to identify repeated portions of non-recognized content, wherein the one or more media streams includes the media stream;
    grouping matching results of previous non-recognized data into a matching fragment set;
    determining a first boundary of data in the previous non-recognized data that matches the segment of non-recognized data based on a combination of adjacent data fragments in the matching fragment set, wherein given adjacent data fragments are fragments adjacent in time;
    determining a second boundary of data in the previous non-recognized data that matches the segment of non-recognized data based on a number of elements in the matching fragment set; and
    determining, by the computing device, a hierarchical nesting of repeated portions of non-recognized content based on the first boundary and the second boundary.

2. The method of claim 1, wherein the first boundary indicates a starting and ending point of first media content, and the second boundary indicates a starting and ending point of second media content, wherein the second media content includes the first media content.

3. The method of claim 1, further comprising providing, by the computing device, data bounded by the first boundary for content identification.

4. The method of claim 1, further comprising providing, by the computing device, data bounded by the second boundary for content identification.

5. The method of claim 1, further comprising providing data bounded by the first boundary or by the second boundary for content identification based on a number of the repeated portions exceeding a threshold.

6. The method of claim 1, further comprising processing the segment of non-recognized data to extract fingerprint features from the segment of non-recognized data.

7. The method of claim 6, further comprising indexing the fingerprint features into a database, wherein the database includes unknown content from media streams.

8. The method of claim 7, wherein determining whether the segment of non-recognized data matches previous non-recognized data from one or more media streams so as to identify repeated portions of non-recognized content comprises comparing the fingerprint features with other fingerprint features stored in the database.

9. The method of claim 1, wherein determining the first boundary of data in the previous non-recognized data that matches the segment of non-recognized data based on the combination of adjacent data fragments in the matching fragment set comprises determining a count of the adjacent data fragments.

10. The method of claim 1, further comprising:
    forming a matching chain of data based on the adjacent data fragments; and
    providing the matching chain of data for content identification.

11. The method of claim 1, further comprising:
    applying a weight to the matching results based on the number of elements in the matching fragment set; and
    determining the second boundary of data in the previous non-recognized data that matches the segment of non-recognized data based on the weight.

12. A non-transitory computer readable medium having stored thereon instructions, that when executed by a computing device, cause the computing device to perform functions comprising:
    receiving a segment of non-recognized data from a media stream, wherein the non-recognized data comprises unknown content;
    determining whether the segment of non-recognized data matches previous non-recognized data from one or more media streams so as to identify repeated portions of non-recognized content, wherein the one or more media streams includes the media stream;
    grouping matching results of previous non-recognized data into a matching fragment set;
    determining a first boundary of data in the previous non-recognized data that matches the segment of non-recognized data based on a combination of adjacent data fragments in the matching fragment set, wherein given adjacent data fragments are fragments adjacent in time;
    determining a second boundary of data in the previous non-recognized data that matches the segment of non-recognized data based on a number of elements in the matching fragment set; and
    determining a hierarchical nesting of repeated portions of non-recognized content based on the first boundary and the second boundary.

13. The non-transitory computer readable medium of claim 12, wherein the first boundary indicates a starting and ending point of first media content, and the second boundary indicates a starting and ending point of second media content, wherein the second media content includes the first media content.

14. The non-transitory computer readable medium of claim 12, wherein the functions further comprise providing data bounded by the first boundary or by the second boundary for content identification based on a number of the repeated portions exceeding a threshold.

15. The non-transitory computer readable medium of claim 12, wherein determining the first boundary of data in the previous non-recognized data that matches the segment of non-recognized data based on the combination of adjacent data fragments in the matching fragment set comprises determining a count of the adjacent data fragments.

16. The non-transitory computer readable medium of claim 12, wherein the functions further comprise:
    forming a matching chain of data based on the adjacent data fragments; and providing the matching chain of data for content identification.

17. A system comprising:
one or more processors;
non-transitory computer readable medium having stored thereon instructions, that when executed by the one or more processors, cause the one or more processors to perform functions comprising:
  receiving a segment of non-recognized data from a media stream, wherein the non-recognized data comprises unknown content;
  determining whether the segment of non-recognized data matches previous non-recognized data from one or more media streams so as to identify repeated portions of non-recognized content, wherein the one or more media streams includes the media stream;
  grouping matching results of previous non-recognized data into a matching fragment set;
  determining a first boundary of data in the previous non-recognized data that matches the segment of non-recognized data based on a combination of adjacent data fragments in the matching fragment set, wherein given adjacent data fragments are fragments adjacent in time;
  determining a second boundary of data in the previous non-recognized data that matches the segment of non-recognized data based on a number of elements in the matching fragment set; and
  determining a hierarchical nesting of repeated portions of non-recognized content based on the first boundary and the second boundary.

18. The system of claim 17, wherein the first boundary indicates a starting and ending point of first media content, and the second boundary indicates a starting and ending point of second media content, wherein the second media content includes the first media content.

19. The system of claim 17, wherein the functions further comprise providing data bounded by the first boundary or by the second boundary for content identification based on a number of the repeated portions exceeding a threshold.

20. The system of claim 17, wherein the functions further comprise:
  processing the segment of non-recognized data to extract fingerprint features from the segment of non-recognized data; and
  indexing the fingerprint features into a database, wherein the database includes unknown content from media streams.

* * * * *